(12) United States Patent
Seupel et al.

(10) Patent No.: US 8,798,169 B2
(45) Date of Patent: Aug. 5, 2014

(54) DATA SUMMARIZATION SYSTEM AND METHOD FOR SUMMARIZING A DATA STREAM

(75) Inventors: Olaf Seupel, Pinnow (DE); Mauro Barbieri, Eindhoven (NL)

(73) Assignee: NXP B.V., Eindhoven (NL)

(*) Notice: Subject to any disclaimer, the term of this patent is extended or adjusted under 35 U.S.C. 154(b) by 1425 days.

(21) Appl. No.: 12/298,205

(22) PCT Filed: Apr. 16, 2007

(86) PCT No.: PCT/IB2007/051345
§ 371 (c)(1),
(2), (4) Date: Oct. 23, 2008

(87) PCT Pub. No.: WO2007/122541
PCT Pub. Date: Nov. 1, 2007

(65) Prior Publication Data
US 2009/0185626 A1  Jul. 23, 2009

(30) Foreign Application Priority Data
Apr. 20, 2006 (EP) .................................... 06112812

(51) Int. Cl.
H04N 7/24 (2011.01)
(52) U.S. Cl.
USPC .................................................. 375/240.26
(58) Field of Classification Search
USPC .................................................. 375/240.26
See application file for complete search history.

(56) References Cited

U.S. PATENT DOCUMENTS

| 2002/0136528 | A1 | 9/2002 | Dagtas |
| 2003/0061612 | A1 | 3/2003 | Lee et al. |
| 2005/0025249 | A1* | 2/2005 | Zhao et al. ............... 375/240.24 |
| 2005/0058160 | A1* | 3/2005 | Lee ................................ 370/512 |
| 2005/0123053 | A1* | 6/2005 | Cooper et al. ........... 375/240.24 |
| 2007/0028187 | A1* | 2/2007 | Katsuyama .................. 715/810 |

FOREIGN PATENT DOCUMENTS

| JP | 2004-328478 | 11/2004 |
| JP | 2005242417 A | 9/2005 |
| WO | 02093929 A1 | 11/2002 |
| WO | 03105489 A | 12/2003 |

OTHER PUBLICATIONS

Kongwah Wan et al; "Automatic Mobile Sports Highlights". IEEE International Conference on Multimedia and Expo, ICME 2005, Amsterdam, The Netherlands, Jul. 6, 2005. pp. 638-641.

(Continued)

Primary Examiner — Gilberto Barron, Jr.
Assistant Examiner — David Le

(57) ABSTRACT

In order to further develop a method for summarizing at least one data stream (12) as well as a corresponding data summarization system (100) comprising at least one receiving means (10) for receiving at least one data stream (12) in such way that at least one summary is available immediately after receiving of the data stream (12), in particular immediately after content acquisition and/or recording and/or encoding and/or decoding of the data stream without any post-processing operation, it is proposed to provide—at least one selecting means (30) for selecting part (32, 32') of the data stream portions and at least one processing means (70) for generating at least one summary by summarizing at least part of the selected data stream portions (32') in particular until at least one predetermined summary volume is obtained, wherein the summary is generated during the receiving of the data stream (12).

16 Claims, 2 Drawing Sheets

(56) References Cited

OTHER PUBLICATIONS

Figure 1:
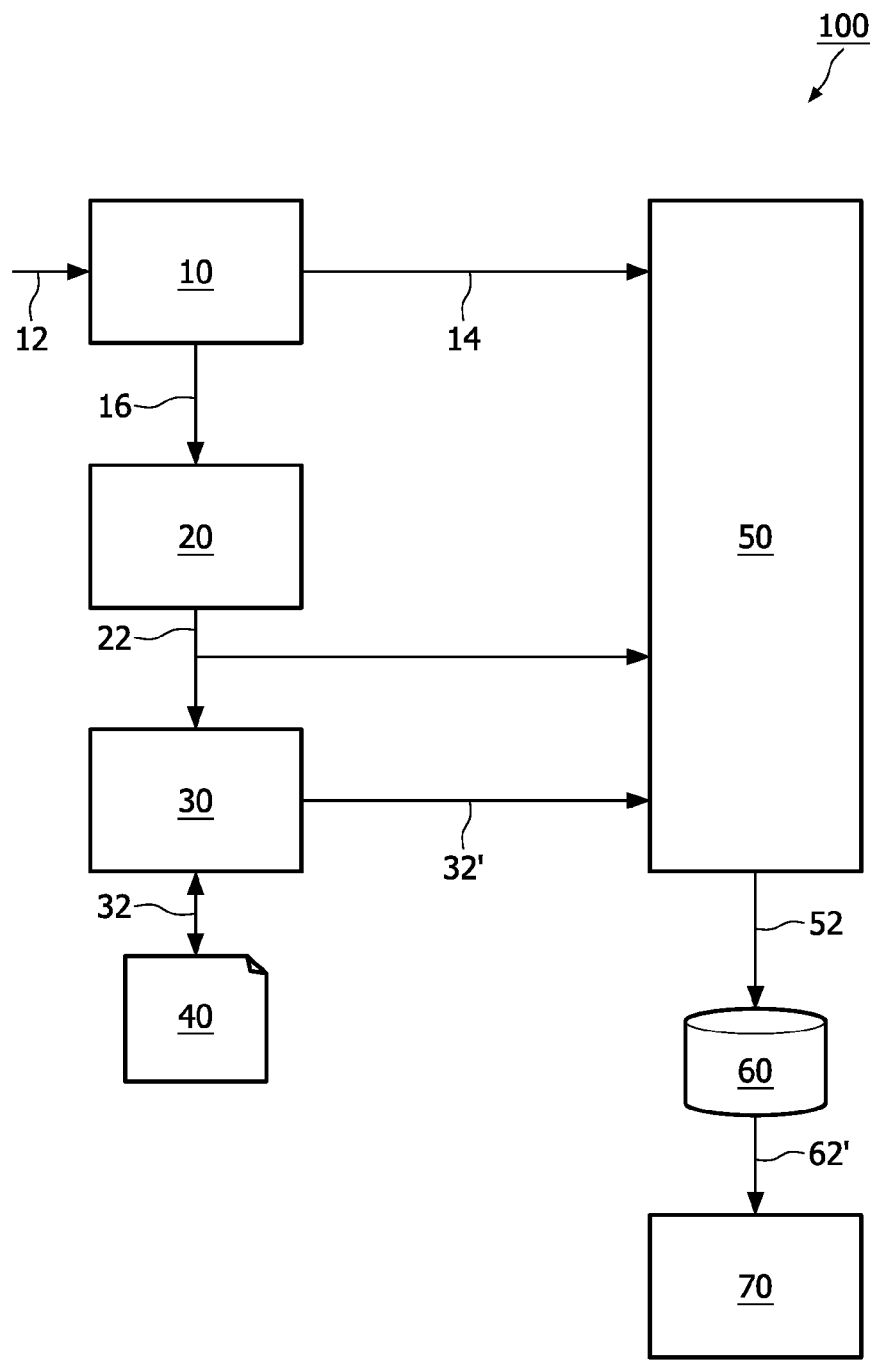

Ahmet Ekin et al; "Automatic Soccer Video Analysis and Summarization", IEEE Transactions on Image Processing, IEEE Service Center, Piscataway, NJ, US. vol. 12, No. 7, Jul. 2003, pp. 796-807.

Divakaran A et al; "Video Browsing System for Personal Video Recorders", Proceedings of the SPIE—The International Society for Optical Engineering SPIE-INT. SOC. OPT. ENG USA, vol. 4861, 2002, pp. 22-25.

Barbieri M et al; "Movie-In-A-Minute: Automatically Generated Video Previews". Lecture Notes in Computer Science, Springer Verlag, Berlin, DE. vol. 3332, No. Part 2, pp. 9-18, 2004.

Lienhart R et al; "Video Abstracting". Communications of the ACM, vol. 40, No. 12, pp. 55-62, Dec. 1997.

Asai K et al; "MPEG-7 Meta-Data Enhanced Encoder System for Embedded Systems". Mar. 2004, CF. http://www.merl.com/.

* cited by examiner

DATA SUMMARIZATION SYSTEM AND METHOD FOR SUMMARIZING A DATA STREAM

The present invention relates to a data summarization system, in particular to a summarization system for a plurality of images, such as for video content or for collections of digital photographs, comprising at least one receiving means for receiving at least one data stream comprising a plurality of data segments with a plurality of data stream portions, in particular for recording and/or for encoding and/or for decoding at least one video content stream.

The present invention further relates to a method for summarizing at least one data stream comprising a plurality of data segments with a plurality of data stream portions, in particular for summarizing at least one video content stream.

Hard disk video recorders and optical disk video recorders allow users to store hundreds of hours of T[ele]V[ision] programs.

To allow users to get a quick overview of the stored content, and to decide whether to view an entire program, an interesting feature is the automatic generation of video previews and video summaries, as for example described in prior art articles "Movie-in-a-Minute: Automatically Generated Video Previews" by Mauro Barbieri, Nevenka Dimitrova, and Lalitha Agnihotri, in "Advances in Multimedia Information Processing—PCM 2004: 5th Pacific Rim Conference on Multimedia", Tokyo, Japan, Nov. 30 to Dec. 3, 2004. Proceedings, Part II. Kiyoharu Aizawa, Yuichi Nakamura, and Shin'ichi Satoh (eds), "Lecture Notes in Computer Science", volume 3332, pages 9 to 18, Springer-Verlag Heidelberg; and "Video Abstracting" by Rainer Lienhart, Silvia Pfeiffer, and Wolfgang Effelsberg, in Communications of the ACM, volume 40, number 12, pages 55 to 62, December 1997.

When a TV program is recorded, these conventional systems analyze the recorded program to automatically create the video preview or summary.

Summarization systems as described in above-cited prior art article "Movie-in-a-Minute: Automatically Generated Video Previews" are designed for analyzing the video content to extract content features after or during recording, wherein the extracted content features are then used to select segments and compose a summary.

According to these conventional summarization systems the selection of the segments is based on the distribution of the features over the whole program and is thus performed as post-processing step once receiving, in particular recording and/or encoding and/or decoding, and content analyzing are finished.

A further video summarization system for video recorders is described in prior art article "MPEG-7 Meta-Data Enhanced Encoder System for Embedded Systems", March 2004, by Kohtaro Asai, Hirofumi Nishikawa, Daiki Kudo, and Ajay Divakaran; cf. http://www.merl.com/.

Similar to the above described conventional summarization system, this video summarization system extracts metadata in real-time, while the actual generation of the summary is done based on the extracted meta-data after the recording is finished.

More particularly, the video summarization system described in above-cited prior art article "MPEG-7 Meta-Data Enhanced Encoder System for Embedded Systems" performs summarization in two steps:

in the first step semantic boundaries, so-called section two, are found;

in the second step the individual segments of interest are summarized using a so-called motion based video summarization method.

The actual summarization is done after all the content and the metadata, in particular segment boundaries and motion information, have been stored.

This results in a delay between the end of the recording and the end of the meta-data generation, i. e. the end of the generation of the summary. Said delay comprises approximately twelve seconds as stated in above-cited prior art article "MPEG-7 Meta-Data Enhanced Encoder System for Embedded Systems".

Beside that, the conventional summarization system described in above-cited prior art article "MPEG-7 Meta-Data Enhanced Encoder System for Embedded Systems" is supposed to be unfavourable because content feature extraction is only applied in a compressed domain.

Since conventional video summarization systems are based on post-processing of the video content after recording or after content acquisition, the summary of a video program is not immediately available after recording is finished.

Recorders that need post-processing after a program has already been stored, are supposed to be non-satisfying because if during recording of a program the device is unplugged from the power source or from the data source, then the content recorded until that moment is available but the summary is not.

A system that generates summaries in real-time during encoding is described in prior art document U.S. 2003/0061612 A1. However, this system is limited to the extraction of key frames. The summary is represented by a set of key frames. Basically, a frame is selected for being a key frame if it contains enough "facial color".

More particularly, this conventional summarization system uses only DC images for feature extraction, thus important movie events could be ignored. In this context a DC image is a reference frame, so called I[ntra]-frame, in a compressed stream. Between an I-frame there are a number of P[redicted]-frames or B[i-directional]-frames.

The distance between two I-frames depends on the chosen G[roup]O[f]P[icture] structure but in general this value is twelve which represents approximately half a second. Thus, the complete set of features is only extractable from a reference frame.

Furthermore, the system proposed in above-cited prior art document U.S. 2003/0061612 A1 does not allow generating a video summary of predefined duration. According to this conventional system an a-priori unknown number of key-frames is generated depending on the characteristics of the video content.

Another limitation of conventional summarization systems based on global optimization is that to generate two summaries of different durations, for example one short version of thirty seconds and one longer of two minutes, these conventional summarization systems require running the optimization procedure, being performed in a post-processing step, at least twice, once for generating the summary with the first duration, for example the thirty seconds summary, and another time for generating the summary with the second duration, for example the two minutes summary.

Moreover, large memory consumption is another problem of conventional video summarization systems. Selecting summary segments the overall distribution of features over the data stream of a program requires keeping all the features in memory or performing many swapping operations.

Starting from the disadvantages and shortcomings as described above and taking the prior art as discussed into account, an object of the present invention is to further develop a data summarization system of the kind as described in the technical field and a method of the kind as described in the technical field, in such way that at least one summary is available immediately after receiving of the data stream, in particular immediately after content acquisition and/or recording and/or encoding and/or decoding of the data stream without any post-processing operation.

The object of the present invention is achieved by a data summarization system comprising the features of claim 1 as well as by a method comprising the features of claim 8. Advantageous embodiments and expedient improvements of the present invention are disclosed in the respective dependent claims.

The present invention is principally based on the idea to provide a data summarization system as well as a method for generating at least one summary of at least one data stream, in particular of at least one video program, in real-time, i. e. while receiving, in particular while acquiring and/or recording and/or encoding and/or decoding, the data stream.

The data stream can for example be transmitted by at least one broadcasting means or can for example be streamed over at least one internet connection and can be assigned for example to at least one T[ele]V[ision] program, such as to at least one movie. Additionally or alternatively, the data stream can be received from an IEEE 1394 connection or from a USB connection, for example with a camcorder or the like.

To enable generation of at least two, in particular multiple, summaries of different volume, in particular of different duration, in one step, according to a preferred embodiment of the present invention the processing means is designed for generating the respective summaries by summarizing at least part of the selected data stream portions until the respective predetermined summary volume, in particular the respective desired summary duration, is obtained. Thus, the present invention allows the generation of multiple summaries of different durations without significant additional computational complexity.

In contrast to prior art, where the data portion selection or content feature extraction is restricted to a compressed domain, according to an advantageous embodiment of the present invention the summary is a collection of data stream portions selected from the received data stream. Thus, for example a video summary is a collection of video segments selected from the original content that best represent the original program.

According to a preferred embodiment of the present invention, the receiving means is designed for recording and/or for encoding the data stream, in particular for calculating at least one recording signal and/or encoding signal, in particular at least one recording statistic and/or encoding statistic, for the respective recorded and/or encoded data stream portions.

For analyzing the content of the received data stream, in particular for analyzing the content of the respective video chapters having been recorded and/or encoded, the data summarization system comprises advantageously at least one content analyzing means.

Said content analyzing means calculates at least one content analyzing signal, in particular at least one content analysis feature, for the respective received data stream portions, wherein the content analyzing signal is advantageously calculated in dependence of the respective recording signal and/or encoding signal of the respective data stream portion.

An exemplary content analyzing signal can be the visual activity of the respective data stream portion, wherein the visual activity can for example be based on at least one average luminance, on at least one average complexity being comparable to the number of bits needed to encode a certain data stream portion, and/or on at least one cut density of the data stream portion.

For content analyzing according to a preferred embodiment of the present invention for example for each data segment at least one luminosity value in the pixel domain and the complexity in the compressed domain is extracted.

The respective calculated content analyzing signals can advantageously be accumulated or summarized for a predetermined number of data stream portions, for example for each respective data stream portion.

For the respective received data stream portions, in particular for the respective recorded and/or encoded video shots, at least one first weighting factor, in particular at least one priority value, for example at least one importance score, is calculated by the selection means.

Said first weighting factor is advantageously calculated in dependence of the respective accumulated or summarized content analyzing signal of the respective data stream portion. Thus, the data stream portions are advantageously weighted by their content analyzing signals or content features, such as by their visual activity.

This first weighting step is advantageously performed data stream portion wise and/or shot wise that mean from shot cut to shot cut. However, it is also possible to calculate the first weighting factor for respective groups of data stream portions, for example to merge adjacent shots and regard them as one clip by performing the first weighting step.

Advantageously the data stream portions are selected dependent on their respective first weighting factor, in particular the highest scored data stream portions are selected to be stored in at least one temporary memory, in particular at least one R[andom]A[ccess]M[emory].

According to a preferred embodiment of the present invention selected data stream portions can be sorted depending on their respective assigned first weighting factor and stored in at least one temporary summary list.

An additional novel aspect of a preferred embodiment of the present invention is the usage of a pre-set limited amount of memory. To use a limited and controlled amount of memory for generating the summary, the temporary memory is advantageously designed for temporarily storing a predetermined or predefined number of selected data stream portions.

For example the temporary memory can be designed for storing the twelve highest weighted data stream portions of the respective data segments, in particular of the respective video chapters. The temporary memory is advantageously freed at the end of at least one, in particular predetermined, selection interval, in particular every time after selecting portions of a respective data segment has been completed, for example every time a video chapter boundary is detected.

According to a particularly inventive refinement of the present invention, the selecting means is designed to select part of the data stream portions being stored in the temporary memory at the end of the predetermined selection interval to be stored permanently or to be transmitted or to be re-encoded in particular in at least one memory means or memory unit, such as in at least one hard disk, to be collected for the summary.

For example, the selecting means can be designed for selecting three of those data stream portions being stored in the temporary memory and being in particular appropriate to reflect the content of the respective data segment, at the end of the selection interval, in particular when a data segment boarder occurs.

In case this term "data segment boarder" refers to a chapter boundary and/or to a shot boundary, such data segment boarder can be calculated by the data summarization system according to the present invention, in particular by the content analyzing means or content analysis component, under the assumption that such data segment boarder is not indicated already in the original content.

Regarding to the fact, that the received data stream, in particular the recorded video sequence, comprises multiple data stream portions, in particular several hundred video clips, a main task of a preferred embodiment of the selection means is to select which data stream portions should stored in the memory unit to be kept for the summary and which can be thrown away.

The selection means is advantageously a real-time summarizing means, guaranteeing that the generation of the summary is completed at the same time and/or before the receiving of the data stream is completed.

In order to be able to generate a summary of the data stream, which is the summarization of the highest weighted data stream portions within the respective data segments, in particular which is a collection of the best video shots within a respective video chapter, according to a preferred embodiment of the present invention at least part of the selected data stream portions are stored permanently in the memory unit or are transmitted.

Moreover, according to a preferred embodiment in the memory unit together with the selected data stream portions, the respective assigned first weighting factor and/or the respective assigned position in the temporary summary list, and/or the respective assigned volume, for example the respective number of bits and/or the respective offset or length, of these data stream portions are stored or are transmitted.

It is also possible, that the memory unit and/or at least one multiplexing means, calculates at least one second weighting factor, in particular at least one second priority value, being assigned to the respective selected data stream portion, wherein the second weighting factor depends on the position of the respective selected data stream portions in the temporary summary list.

When the summary is to be rendered and/or played back, the summary is generated by collecting at least part of the selected data stream portions in particular depending on the respective second weighting factor.

According to a preferred embodiment the number of data stream portions being summarized for the summary depends on the desired volume of the summary. Thus, data stream portions can be summarized while receiving the data stream until at least one predetermined number of summarized data segments and/or at least one predetermined summary duration is obtained.

Thus, calculating the first weighting factor and/or the second weighting factor allows ranking the data stream portions to select only the best ones until a certain duration for the summary is obtained.

The main advantage of the present invention is that the generation of the summary is completed at the same time as the receiving of the broadcasted data stream is completed. Thus, in contrast to conventional summarization systems according to the present invention there is no delay between the end of the receiving and the end of generating the summary. Therefore, the generation of the summary is guaranteed even if the summarization system is suddenly detached from the power outlet or from the data source.

The present invention relates to the use of at least one data summarization system as described above and/or of at least one method as described above in at least one electronic system for generating at least one video summary of at least one video content stream in real-time during recording and/or encoding and/or decoding the video content stream, in particular for real-time generation of movie-in-a-minute during video recording and/or video encoding and/or video decoding, wherein more particularly a limited and controlled amount of memory is used for generating the summary and/or also the case is covered in which there is no re-encoding, for example when recording digital T[ele]V[ision] from a digital satellite or terrestrial (D[igital]V[ideo]B[roadcasting]) receiver where the content is not necessarily re-encoded, and/or for generating at least two summaries of the video content stream, with each summary having a different volume, in particular a different duration.

In this context, the electronic system can be implemented as at least one software and/or hardware being designed for recording and/or for encoding data streams, for example as at least one video recorder, as at least one video encoder, and/or as at least one P[ersonal]C[omputer], such as as at least one home media centre P[ersonal]C[omputer], and/or as at least one software and/or hardware equipment for video compression and/or broadcasting machinery, and/or as at least one digital camcorder and/or as at least one related software.

More particularly, the present invention can be applied in consumer electronic products, such as personal video recorders, home media centre P[ersonal]C[omputer]s, and video encoders (software and hardware). Additionally, the present invention can be applied in professional software/hardware equipment for video compression and broadcasting machinery.

The present invention can also be applied to digital camcorders for generation of a summary of a home video while downloading the content from the camcorder to a stationary device.

As already discussed above, there are several options to embody as well as to improve the teaching of the present invention in an advantageous manner. To this aim, reference is made to the claims respectively dependent on claim 1 and on claim 8; further improvements, features and advantages of the present invention are explained below in more detail with reference to a preferred embodiment by way of example and to the accompanying drawings where FIG. 1 schematically shows a preferred embodiment of the data summarization system according to the present invention being operated according to the method of the present invention; and FIG. 2 schematically shows a preferred embodiment of the method of the present invention.

Figure 2:
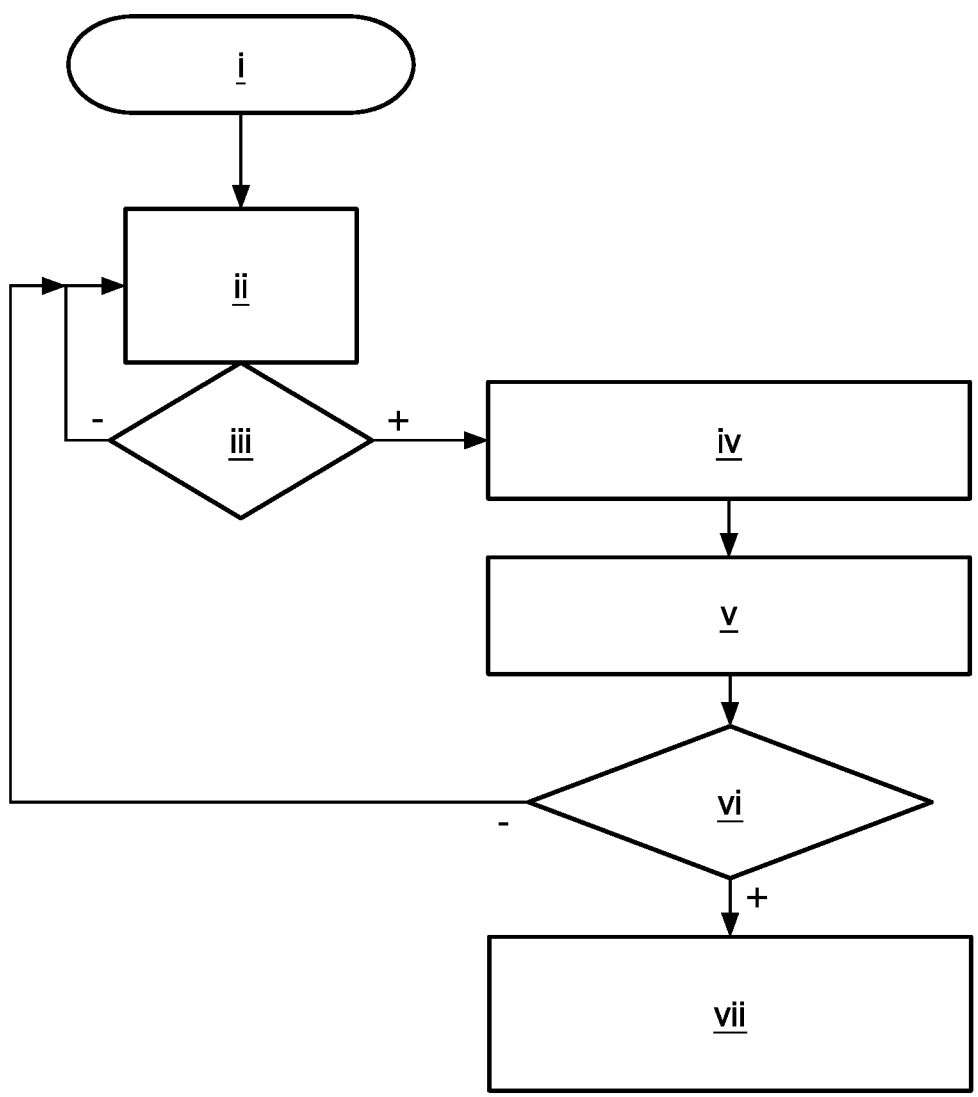

FIG. 1 shows a block diagram of a preferred embodiment of the data summarization system 100, namely a video content summarization system, more particularly a real-time video summarization system, for summarizing the content of at least one data stream 12, in particular of at least one video content stream.

Source of the data stream, in particular content source, can be for example at least one cable T[ele]V[ision] tuner, at least one satellite tuner, at least one a hard disk or optical disk drive and/or at least one Internet streaming connection.

For receiving the video content stream 12 the video summarization system 100 comprises a receiving means 10 being designed for receiving and for recording in particular for encoding the video content stream 12.

The receiving means 10 can be any multimedia encoder for example being operated according to M[oving]P[icture]E[xperts]G[roup]-2 standard, according to M[oving]P[icture]E[xperts]G[roup]-4 standard, and/or according to W[indow]M[edia]V[ideo].

The receiving means 10 encodes the received video content stream 12, in particular by compressing the video content stream 12 to save storage space. During recording, in particular when generating encoded content 14 of the video content stream 12, the receiving means 10 further generates at least one low level signal or at least one encoding signal 16, in particular at least one low level signal statistics or at least one encoding statistics, for example on picture slice level.

Low level signal statistics or encoding statistics 16 can be any statistical information related to the video content stream 12 computed during encoding such as average luminance, average frame difference, average of the motion vectors, complexity, bit-rate, etc.

The receiving means 10 is designed for providing at least one optional multiplexing means 50 with the encoded content 14 of the video content stream 12, in particular with the respective encoded video shots. Moreover, the receiving means 10 is designed for providing at least one content analyzing means 20, in particular at least one content analysis component, with the low level signal statistics or encoding statistics 16.

The content analysis component 20 uses the low level signal statistics or encoding statistics 16 to compute at least one content analyzing signal 22, in particular so called low-level and/or high-level content analysis features such as luminosity, presence of black frames, video shot cuts, amount of action, location of faces and/or chapter boundaries (cf. prior art document WO 02/093929 A1).

In other words, shot cut detection and chapter boundary detection is done in the content analyzing block 20, in particular when the received data stream 12 does not comprise any data segments with any data stream portions already indicated, for example when the received video content stream does not comprise any video chapter with any video shot already indicated; thus, the video chapters are computed in the content analysis component 20, as shown in FIG. 1.

The low-level features and/or the high-level features 22 can advantageously be computed stream portion wise and/or video shot wise that mean from video shot cut to video shot cut. After being calculated the low-level and/or high-level content analysis features 22 are transmitted to the multiplexing unit 50 as well as to at least one selecting means 30, in particular to at least one real-time summarizer.

The real-time summarizer 30 is advantageously a hierarchical computing component being in particular intended to calculate at least one first weighting factor, in particular at least one first priority value, more particularly at least one importance score depending on the respective content analysis features 22.

The real-time summarizer 30 uses the content analysis features 22 to rate the video shots being selected for at least one summary of the video content stream 12. The selection of the video shots and the real-time generation of the summary are based on keeping at least one sorted list namely a so called temporary summary list of the best N video shots for the current video chapter. In this context the number of N depends on the amount of available memory space.

For example, the real-time summarizer 30 can be designed for selecting part of the data stream portions or video shots 32 dependent on the respective first weighting factor and transmitting these selected video shots 32 to at least one temporary memory 40, in particular at least one R[andom]A[ccess]M[emory].

Said R[andom]A[ccess]M[emory] 40 is for example designed for storing twelve selected video shots 32 in the temporary summary list, wherein selected video shots 32 having a lower first weighting factor are replaced by selected video shots 32 having a higher first weighting factor.

After at least one selection interval, for example after the selection of video shots 32 of a video chapter has been performed, the temporary memory 40 is freed, at least part 32 of the selected video shots 32', for example three video shots, are selected dependent on their respective first weighting factor to be stored permanently.

The at least part selected video shots 32' are transmitted to the multiplexing unit 50. The encoded content 14, the content analysis features 22 and the summary data 32' are multiplexed for example by means of at least one M[oving]P[icture]E[xperts]G[roup] program or transport stream case in which features and summary are in private streams, and stored in at least one memory unit 60, in particular to at least one storage such as in at least one hard disk.

In an alternative embodiment, encoded content 14, content analysis features 22 and final summary are stored separately in different streams. Additionally content analysis features 22 and final summary can be encoded according to the M[oving]P[icture]E[xperts]G[roup]-7 standard or any other suitable metadata standard.

In an alternative embodiment the resulting stream(s) is transmitted using at least one broadcast system, or streamed over at least one Internet connection.

At least one processing means 70, in particular at least one summary player, is designed for generating the summary by selecting at least part of the selected data stream portions 32' until at least one predetermined summary volume is obtained.

The summary player 70 retrieves from the storage device 60 the summary data 62 and renders, in particular after decoding, a summary of the duration that is required by the user and/or at least one application.

The summary player 70 reproduces the summary by taking data stream portions with the highest priority for each data segment until the desired duration is reached. In this way it is possible to retrieve multiple summaries of different durations without reanalyzing the features.

The logical steps performed by the real-time summarizer 30 are illustrated in FIG. 2. More particularly, FIG. 2 depicts a flow chart diagram of real-time generation of movie-in-a-minute during video recording or encoding or decoding.

Upon starting (=reference numeral [i] in FIG. 2) recording, in particular encoding, of the video content stream 12 is started.

The generated low level signal statistics or encoding statistics 16 is used for calculating the content analyzing signals or content analysis features 22, wherein the respective generated content analysis features 22 are accumulated (=reference numeral [ii] in FIG. 2) for a respective video shot.

Upon a video shot cut (=reference numeral [iii] in FIG. 2) the importance score for the current video shot is computed (=reference numeral [iv] in FIG. 2). Thus, the first weighting factor, namely the importance score, is computed for each new video shot.

The importance score models the suitability of a video shot for being part of the summary and it is a combination of content analysis features 22, for example amount of action, number and size of detected faces.

A method to compute the importance score is described for example in prior art article "Movie-in-a-Minute: Automatically Generated Video Previews" by Mauro Barbieri, Nevenka Dimitrova, and Lalitha Agnihotri, in "Advances in Multimedia Information Processing—PCM 2004: 5th Pacific Rim Conference on Multimedia", Tokyo, Japan, Nov. 30 to Dec. 3, 2004. Proceedings, Part II. Kiyoharu Aizawa, Yuichi Nakamura, and Shin'ichi Satoh (eds), "Lecture Notes in Computer Science", volume 3332, pages 9 to 18, Springer-Verlag Heidelberg.

If the importance score value of the current video shot is bigger then the value of the video shots currently stored in the temporary summary list, the current video shot and its importance score are inserted (=reference numeral [v] in FIG. 2) in the sorted list, i. e. in the temporary summary list. Creating and inserting the video shot and its importance score in the sorted list can be performed according to at least one conventional computer science method.

At the end of the respective selection interval, in particular every time a chapter boundary is detected (=reference numeral [vi] in FIG. 2) by the content analysis component 20, the video shots 32 stored in the temporary summary list are removed from the temporary summary 40 to become part of the summary. Thus, the temporary summery list is flushed (=reference numeral [vii] in FIG. 2) periodically.

Each summary data 32', i. e. video shot being transmitted from the real-time summarizer 30 via the multiplexing unit 50 to the memory unit 60 has associated a second priority value that is the position it had in the temporary summary list.

At any instant in time a user can stop the recording or unplug the power source cable or data source cable of the summarization system 100 without affecting the summary so far generated. The only data stream portions or video shots missing will be the ones stored in the temporary summary list if the list was stored in volatile memory 40.

List of Reference Numerals

100 data summarization system, in particular video content summarization system

10 receiving means, in particular recording unit and/or encoding unit

12 data stream comprising plurality of data segments with plurality of data stream portions, in particular video content stream which may comprise plurality of video chapters with plurality of video shots

14 output signal of receiving means 10, in particular recorded and/or encoded received data stream, for example encoded content, being transmitted from receiving means 10 to multiplexing means 50

16 recording signal and/or encoding signal, in particular recording statistic and/or encoding statistic, being in particular transmitted from receiving means 10 to content analyzing means 20

20 content analyzing means, in particular content analysis component

22 content analyzing signal, in particular content analysis feature, being calculated by content analyzing means 20, for example low-level features and/or high-level features

30 selecting means, in particular real-time summarizer

32 part of data stream portions being selected by selecting means 30 for being stored temporarily, in particular selected data stream portions

32' part of selected data stream portions 32 being selected by selecting means 30 for being stored permanently

40 temporary memory, in particular volatile buffer or volatile memory, for example R[andom]A[ccess]M[emory], for example storing temporary summary list

50 multiplexing means, in particular multiplexer

52 output signal of multiplexing means 50, in particular multiplexed stream

60 memory unit, for example hard disk

62 output of memory unit 60, in particular part of selected data stream portions being transmitted from memory unit 60 to processing means 70 to be summarized

70 processing means, in particular summary player

The invention claimed is:

1. A data summarization system comprising at least one encoder for receiving at least one data stream,
   characterized by
   at least one summarizer configured to select part of the data stream portions and
   at least one summary player configured to generate at least one summary by summarizing at least part of the selected data stream portions in particular until at least one predetermined summary volume is obtained, wherein the summary is generated during the receiving of the data stream, wherein the generation of the summary is completed at the same time or before the receiving of the data stream is completed.

2. The data summarization system according to claim 1, characterized in
   that the data stream is at least one video data stream, or
   that the encoder is designed for recording or for encoding the data stream, in particular for calculating at least one recording signal or encoding signal for the respective recorded or encoded data stream portions.

3. The data summarization system according to claim 1, characterized by at least one content analyzing component configured to analyze the content of the received data stream, in particular for calculating at least one content analyzing signal for the respective received data stream portions, wherein the content analyzing signal is in particular calculated in dependence of the respective recording signal or encoding signal of the respective data stream portion, and
   accumulate the respective calculated content analyzing signals of a predetermined number of data stream portions, for example of a single data stream portion.

4. The data summarization system according to claim 1, characterized in that the summarizer is at least one real-time summarizer or is designed
   for calculating at least one first weighting factor, in particular at least one first priority value, for the respective received data stream portions, wherein the first weighting factor is in particular calculated in dependence of the respective content analyzing signal of the respective data stream portion,
   for selecting part of the data stream portions dependent on the respective first weighting factor, in particular
   for selecting part of the data stream portions to be stored temporarily in at least one temporary memory, in particular in at least one R[andom]A[ccess]M[emory], or
   for selecting at least part of the selected data stream portions to be stored permanently or to be transmitted, in particular in at least one memory unit.

5. The data summarization system according to claim 4, characterized in that the temporary memory is designed for
   sorting the respective selected data stream portions in at least one temporary summary list depending on the respective assigned first weighting factor or
   using at least one limited or controlled amount of memory space for storing the selected data stream portions, in particular for storing a predetermined number of selected data stream portions.

6. The data summarization system according to claim 1, characterized by at least one multiplexing unit,
being provided
with at least one output signal of the encoder, in particular with the recorded or encoded data stream, or
with the content analyzing signal or
with the data stream portions selected to be stored permanently or to be transmitted, or
being designed for calculating at least one second weighting factor, in particular at least one second priority value, for the respective data stream portions selected to be stored permanently, wherein the second weighting factor depends in particular on the position of the respective selected data stream portions in the temporary summary list.

7. The data summarization system according to claim 6, characterized in that
the memory unit is designed for sorting the permanently stored data stream portions in at least one final summary list depending on the second weighting factor being assigned to the respective permanently stored data stream portion, or the processing unit is designed for
selecting at least part of the permanently stored data stream portions or summarizing the at least part of the selected data stream portions until at least one predetermined number of summarized data segments is obtained.

8. A method for summarizing at least one data stream, characterized by
selecting part of the data stream portions and
generating at least one summary by summarizing at least part of the selected data stream portions in particular until at least one predetermined summary volume is obtained, wherein the summary is generated during receiving the data stream,
wherein the generation of the summary is completed at the same time or before the receiving of the data stream is completed.

9. The method according to claim 8, characterized by
recording or encoding or decoding the received data stream, in particular the received data stream portions, in particular calculating at least one recording signal or encoding signal for the respective recorded or encoded data stream portions or
analyzing the content of the received data stream, in particular calculating at least one content analyzing signal for the respective received data stream portions, wherein the content analyzing signal is in particular calculated in dependence of the respective recording signal or encoding signal of the respective data stream portion, and
accumulating the respective calculated content analyzing signals of a predetermined number of data stream portions, or
calculating at least one first weighting factor, in particular at least one first priority value, for the respective received data stream portions, wherein the first weighting factor is in particular calculated in dependence of the respective content analyzing signal of the respective data stream portion,
selecting part of the data stream portions dependent on the respective first weighting factor, in particular
selecting part of the data stream portions to be stored temporarily, or for selecting at least part of the selected data stream portions to be stored permanently.

10. The method according to claim 8, characterized in that the step of selecting part of the data stream portions to be stored temporarily comprises
sorting the respective selected data stream portions in at least one temporary summary list depending on the respective assigned first weighting factor or
using at least one limited or controlled amount of memory space for storing the selected data stream portions, in particular storing a predetermined number of selected data stream portions.

11. The method according to claim 10, characterized by
transmitting at least part of the selected data stream portions to be stored permanently at the end of at least one selection interval, in particular when at least one data segment boundary is detected, or
sorting the permanently stored data stream portions in at least one final summary list depending on at least one second weighting factor, in particular at least one second priority value, being assigned to the respective permanently stored data stream portion, wherein the second weighting factor in particular depends on the position of the respective selected data stream portions in the temporary summary list, or
selecting at least part of the permanently stored data stream portions, or
summarizing the at least part of the selected data stream portions until at least one predetermined number of summarized data segments is obtained.

12. At least one electronic system, in particular
at least one software or hardware being designed for recording or for encoding data streams, in at least one video recorder, in at least one video encoder, or in at least one P[ersonal]C[omputer], or
at least one software or hardware equipment for video compression or broadcasting machinery, or
at least one digital camcorder or in at least one related software, for generating at least one video summary of at least one video content stream in real-time during recording or encoding or decoding the video content stream, in particular for real-time generation of movie-in-a-minute during video recording or video encoding or video decoding, wherein in particular for generating the summary a limited and controlled amount of memory is used, or for generating at least two summaries of the video content stream, with each summary having a different volume, in particular a different duration, wherein the electronic system comprises the data summarization system of claim 1.

13. The data summarization system of claim 1, wherein the generation of the summary is completed at the same time the receiving of the data stream is completed.

14. The data summarization system of claim 1, wherein the generation of the summary is completed before the receiving of the data stream is completed.

15. The method of claim 8, wherein the generation of the summary is completed at the same time the receiving of the data stream is completed.

16. The method of claim 8, wherein the generation of the summary is completed before the receiving of the data stream is completed.

* * * * *